United States Patent [19]

Masuda et al.

[11] Patent Number: 4,723,812
[45] Date of Patent: Feb. 9, 1988

[54] LOCKING DEVICE FOR A VEHICLE ROOF OPENING AND CLOSING APPARATUS

[75] Inventors: Mitsuyoshi Masuda, Nagoya; Shunji Kido; Kazuya Gonda, both of Kariya, all of Japan

[73] Assignee: Aisin Seiki Kabushiki Kaisha, Japan

[21] Appl. No.: 896,711

[22] Filed: Aug. 15, 1986

[30] Foreign Application Priority Data

Aug. 16, 1985 [JP] Japan .............................. 60-125204[U]

[51] Int. Cl.$^4$ .............................. B60J 7/11; B60J 7/19
[52] U.S. Cl. ...................................... 296/224; 296/218;
49/465; 292/263; 292/277
[58] Field of Search .................. 296/218, 224; 49/465;
292/263, 277

[56] References Cited

U.S. PATENT DOCUMENTS

| 4,005,901 | 2/1977 | Lutke et al. ............... 296/224 X |
| 4,038,910 | 8/1977 | Kneusels et al. ................ 296/218 |
| 4,364,600 | 12/1982 | Hauber ............................ 296/218 |

FOREIGN PATENT DOCUMENTS 58-32049 7/1983 Japan .

Primary Examiner—Dennis H. Pedder
Attorney, Agent, or Firm—Finnegan, Henderson, Farabow, Garrett & Dunner

[57] ABSTRACT

A locking device in an apparatus for opening and closing the roof of a vehicle includes a bracket secured to the vehicle body and having a pair of hooks, a handle pivotally mounted on a door receivable within an opening formed in the roof, links pivotally mounted on the handle, and a shaft unit secured to one ends of the links and having a pair of plungers engageable with the hooks to couple the handle to the bracket. The plungers can be pushed inwardly on the shaft unit against the force of a compression spring to permit the plungers to be disengaged from the hooks, thereby uncoupling the handle from the bracket. This enables the door to be swung open.

6 Claims, 7 Drawing Figures

LOCKING DEVICE FOR A VEHICLE ROOF OPENING AND CLOSING APPARATUS

BACKGROUND OF THE INVENTION

1. Field of the Invention

This invention relates to a locking device in an apparatus for opening and closing the roof of an automotive vehicle. More particularly, the invention relates to a locking device by which a door covering an opening in a roof can be tilted with respect to the opening and both attached and detached through a simple operation.

2. Description of the Prior Art

Basically, an apparatus for opening and closing the roof of a vehicle includes a bracket fixedly secured to a stationary part of the vehicle structure, a hook provided on the bracket, a handle pivotally mounted on a door received in and covering an opening in the roof, links and a shaft unit secured to the links. The bracket and handle are connected to each other via the links and shaft unit. Various proposals concerning the shaft unit have been made for the purpose of attaching and detaching the door to and from the opening in the roof. One prior-art example thereof is disclosed in the specification of Japanese Patent Publication (Kokoku) No. 58-32049, in which a pin provided on the shaft unit is fitted in a slot of the bracket hook and held within the slot by a stopper. In order to disengage the pin from the hook, therefore, it is required that a knob for operating the stopper be pressed to shift the stopper from a position facing the pin to a position not facing the pin.

Thus, in accordance with the prior-art device, detaching the door from the roof opening entails the laborious operation of shifting the pin, which is engaged with the hook of the bracket secured to the vehicle structure, in the radial direction from the inside of the hook while operating the knob to retract the stopper and hold the stopper in the retracted state.

SUMMARY OF THE INVENTION

An object of the present invention is to provide a locking device which overcomes the aforementioned drawbacks of the prior-art device.

Additional objects and advantages of the invention will be set forth in part in the description which follows, and in part will be obvious from the description, or may be learned by practice of the invention. The objects and advantages of the invention may be realized and attained by means of the instrumentalities and combinations particularly pointed out in the appended claims.

To achieve the objects and in accordance with the purpose of the invention, as embodied and broadly described herein, the locking device of this invention is for use in an apparatus for opening and closing the roof of a vehicle and comprises a bracket designed to be secured to a stationary part of the vehicle body and having hooks at a distal end, each of the hooks having a central slot and a slit leading to the central slot; a handle designed to be pivotally mounted on a door receivable within an opening formed in the roof; at least one link pivotally mounted on the handle; and a hollow shaft unit secured to one end of at least one link and adapted to be engaged by the hooks; the shaft unit including a pair of plungers mounted in opposite end portions for longitudinal movement and a compression spring positioned within the shaft unit between the plungers for biasing the plungers longitudinally outwardly of the shaft unit, each plunger having an enlarged diameter portion and a reduced diameter portion and normally engaged at the enlarged diameter portion in the slot of a corresponding one of the hooks, the reduced diameter portion of each plunger being permitted to pass through the slit in the corresponding hook by moving the plungers longitudinally inwardly of the shaft unit against the compression spring.

More specifically, each plunger is normally biased by the compression spring so that the enlarged diameter portion thereof is normally engaged with the slot in the corresponding hook. When detaching the door from the roof opening, the plungers are pushed longitudinally inwardly of the shaft unit against the force of the compression spring, as a result of which the reduced diameter portions of the plungers are brought to a position facing the slits leading to the slots in the hooks. Since the reduced diameter portion of each plunger is of a diameter less than the width of the corresponding slit, the plunger can be readily disengaged from the hook to detach the door from the roof opening.

According to the present invention, detaching the door is performed merely by pushing the plungers constituting the shaft unit longitudinally inwardly of the shaft unit so that the reduced diameter portions of the plungers are brought to a position facing the slits leading to the slots of the hooks, and then disengaging these reduced diameter portions from the slits. This greatly facilitates the door detaching operation. Attaching the door to the roof is accomplished very easily merely by pushing the plungers into the shaft unit and passing the smaller diameter sections of the pins through the slits in the hooks.

Other features and advantages of the present invention will be apparent from the following description taken in conjunction with the accompanying drawings, in which like reference characters designate the same or similar parts throughout the figures thereof.

DESCRIPTION OF THE PREFERRED EMBODIMENT

Figure 1:
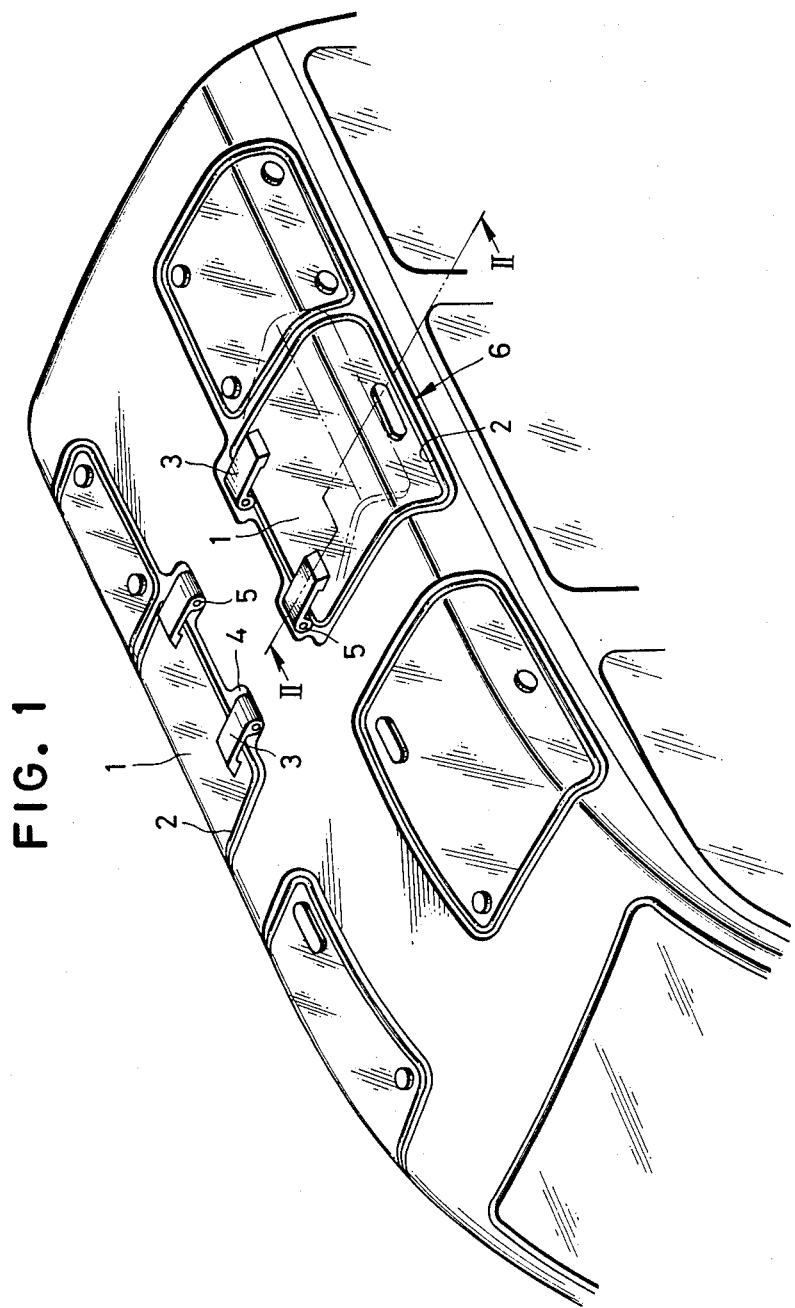
FIG. 1 is a partial perspective view of an openable roof for a vehicle employing the locking device of the present invention.

FIG. 1 shows an example of an openable roof for a motor vehicle, in which numeral 1 designates a tiltable door received within a roof opening 2 in the body of the vehicle. Provided at one side edge of the door 1 are a plurality of male elements 3 rotatably mounted on corresponding female elements 4 on the vehicle body via pins 5. Provided on the opposite side edge of the door 1 is a locking unit 6.

The construction of the locking unit 6 will now be described with reference to FIGS. 2 and 3. Basically, the locking unit 6 comprises a first bracket 8 secured to the roof or the chassis and having a pair of hooks 7 at a forward portion thereof, a handle 10 pivotally mounted on the door 1 by a second bracket 9, a pair of link members 11 for connecting the first bracket 8 and the handle 10, and a shaft unit 12. The handle 10 has a pair of cut-outs 13 formed in side walls thereof for receiving the shaft unit 12, and a pin 16 for axially supporting one end of each of the links 11. A tension spring 15 is stretched between a lateral edge of the handle 10 and a pin 14 both ends whereof are secured to the link members 11, whereby the door 1 is held in the closed state. The spring 15 is adapted to respond in such a manner that the weight of the door 1 itself will not act to resist an operation for tilting the door 1 but will maintain the door in the tilted state.

The shaft unit 12 is molded to form an integral part of the link members 11 and can be fitted into the hooks 7 of the first bracket 8. The shaft 12 may also be freely engaged with the cut-outs 13 formed in the handle 10.

Figure 2:
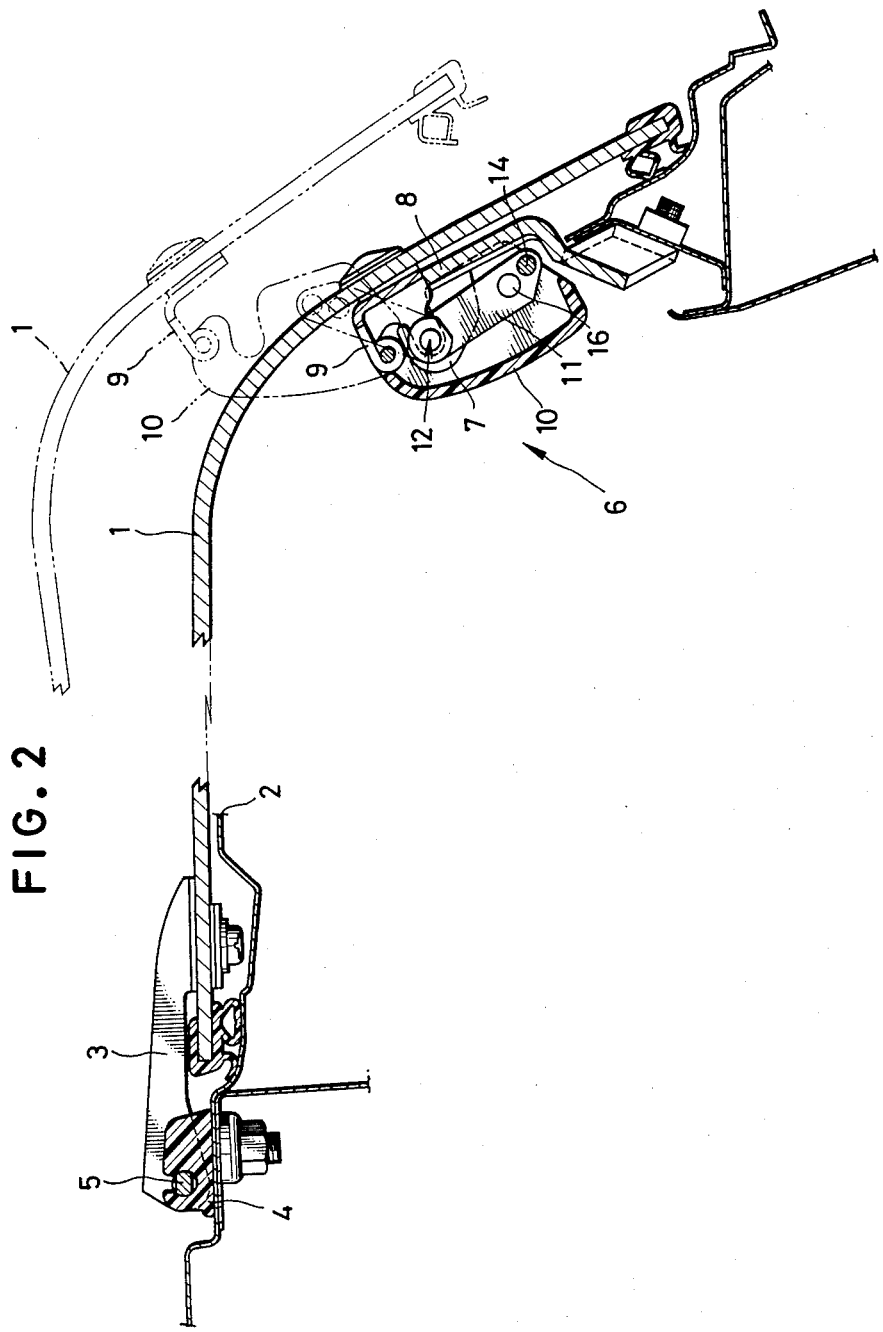
FIG. 2 is a sectional view taken along line II—II of FIG. 1.
Figure 3:
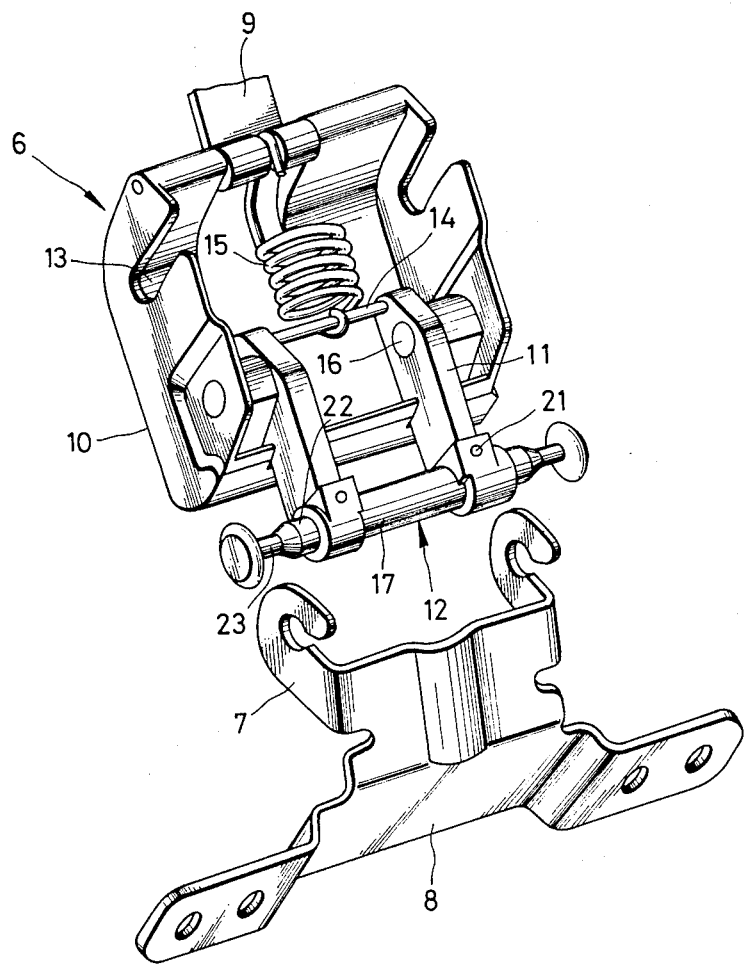
FIG. 3 is a perspective view showing the locking device of the invention.

In the state where the door 1 is closed, as shown by the solid lines in FIG. 2, the shaft unit 12 is fitted in the cut-outs 13 of handle 10 so that the link members 11 are covered in their entirety. When the door 1 is to be tilted as indicated by the phantom lines in FIG. 2, the shaft unit 12 is disengaged from the cut-outs 13 and the handle 10 is shifted to the position indicated by the phantom lines.

An embodiment of the shaft unit 12 forming an essential portion of the present invention will now be described with reference to FIGS. 4 through 7.

The shaft unit 12 has a hollow cylindrical portion 7 formed integrally with the pair of links 11. A compression spring 18 is disposed within the cylindrical portion 17. A pair of plungers 19 are inserted into the cylindrical portion 17 from both open ends thereof to compress the spring 18. The distal end of a stopper pin 21 driven in from outside of the cylindrical portion 17 fits into a recess 20 provided in each plunger 19 longitudinally thereof. Thus, the plungers 19 will not fall out of the cylindrical portion 17 and can be introduced into the cylindrical portion 17 against the urging force of the compression spring 18. Each plunger 19 is composed of an enlarged diameter portion 22 and a reduced diameter portion 23. A guide pin 24 is slidably introduced into a central bore of each plunger 19 and serves to align the central axis of each plunger and that of the cylindrical portion 17. The distal end of each plunger 19 is fitted with a button 29.

Each hook 7 of the first bracket 8 has a slot 26 for mating with the enlarged diameter portion 22 of the corresponding plunger 19, and a slit 27 leading to the slot 26 and sized to permit the reduced diameter portion 23 of the plunger 19 to pass therethrough.

Figure 4:
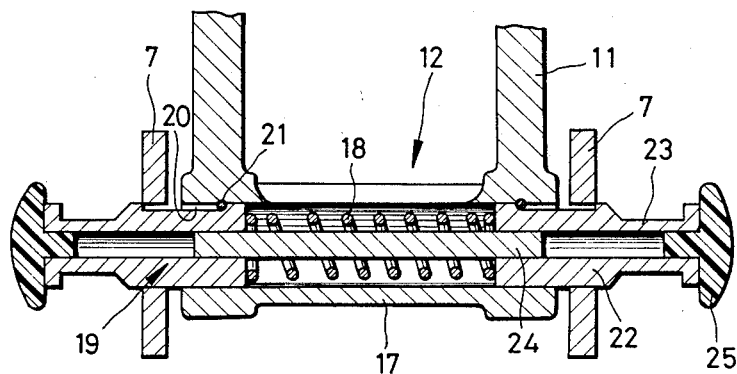
FIG. 4 is a sectional view of a shaft unit having pins engaging with hook slots.
Figure 5:
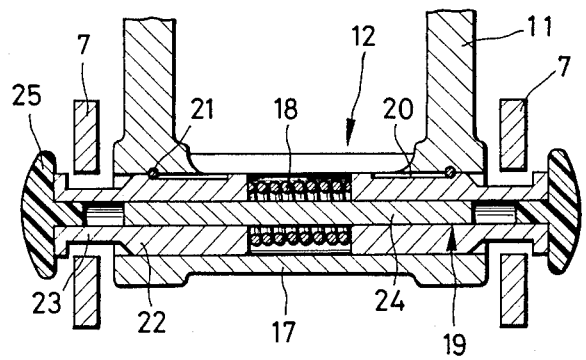
FIG. 5 is a sectional view of the shaft unit in which the pins are pushed into a cylindrical portion of the shaft unit.
Figure 7:
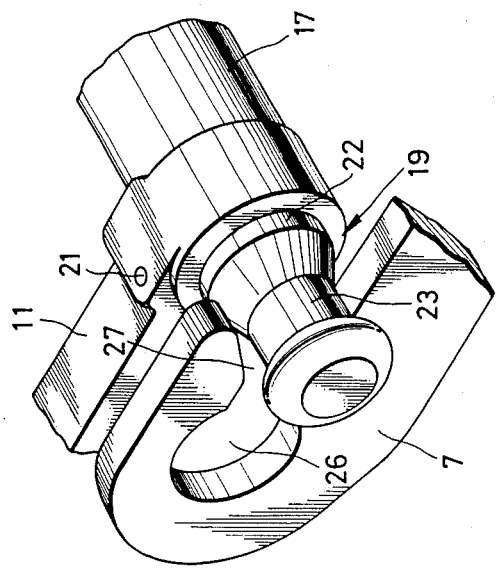
FIG. 7 is a partial perspective view showing a reduced diameter portion of the pin being passed through a slit leading to the slot of the corresponding hook, with the pin being pushed inwardly into the cylindrical portion.
Figure 6:
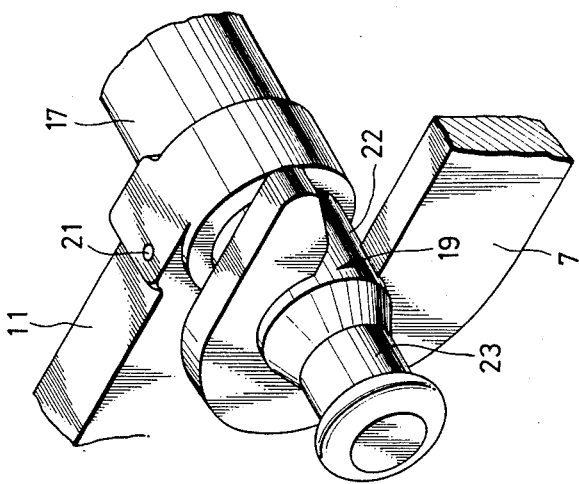
FIG. 6 is a partial perspective view showing one of the pins engaged with the slot of a corresponding hook at an enlarged diameter portion of the pin.

When the door 1 is in the closed state, at which time the plungers 19 are engaged with the hooks 7, the enlarged diameter portion 22 of each plunger 19 is received within the slot 26 of the corresponding hook 7, as shown in FIGS. 4 and 6. Since the enlarged diameter portion 22 of the plunger 19 is larger in size than the slit 27 in hook 7, the plunger 19 will not disengage from the hook 7. When the two plungers 19 are pushed inward simultaneously by hand, the enlarged diameter portion 22 of each plunger 19 is forced into the cylindrical portion 17 against the compression spring 18, thus bringing the reduced diameter portion 23 of the plunger 19 to a position at which it will face the slot 26 of hook 7, as depicted in FIGS. 5 and 7. The reduced diameter portion 23 of each plunger 19 is then withdrawn from the corresponding hook 7 via the slit 27 to disengage the shaft unit 12 from the first bracket 8. The door 1 can thus be detached from the roof of the vehicle.

As many apparently widely different embodiments of the present invention can be made without departing from the spirit and scope thereof, it is to be understood that the invention is not limited to the specific embodiments thereof except as defined in the appended claims.

What we claim is:

1. A locking device for use in an apparatus for opening and closing the roof of a vehicle, comprising:
   a bracket designed to be secured to a stationary part of the vehicle body and having hooks at a distal end thereof, each of said hooks having a central slot and a slit leading to said central slot;
   a handle designed to be pivotally mounted on a door receivable within an opening formed in the roof;
   at least one link pivotally mounted on the handle; and
   a hollow shaft unit secured to one end of said at least one link and adapted to be engaged by said hooks;
   said shaft unit including a pair of equal transverse dimension plungers mounted in opposite end portions thereof for longitudinal movement and a compression spring positioned within the shaft unit between said plungers for biasing said plungers longitudinally outwardly of the shaft unit, each of said plungers having an enlarged diameter portion and a reduced diameter portion and being normally engaged at the enlarged diameter portion in the slot of a corresponding one of said hooks, the reduced diameter portion of each of said plungers being permitted to pass through the slit in the corresponding hook by moving the plungers longitudinally inwardly of said shaft unit against said compression spring.

2. A locking device as claimed in claim 1 having two links pivotally mounted on the handle, and wherein said hollow shaft unit is formed integrally with the two links.

3. A locking device as claimed in claim 2 wherein each plunger has a central bore and further comprising a guide pin slidably positioned in said central boxes.

4. A locking device as claimed in claim 3 further comprising stopper pins mounted in the hollow shaft unit to limit movement of the plungers.

5. A locking device as claimed in claim 4 wherein said shaft unit is cylindrical in shape.

6. A locking device as claimed in claim 5 wherein the handle has a pair of side walls and a cut-out slot formed in each side wall for receiving the shaft unit when the locking device is in the locked position.

* * * * *